No. 766,933. PATENTED AUG. 9, 1904.
N. W. COON.
GARDEN TOOL.
APPLICATION FILED APR. 22, 1904.
NO MODEL.
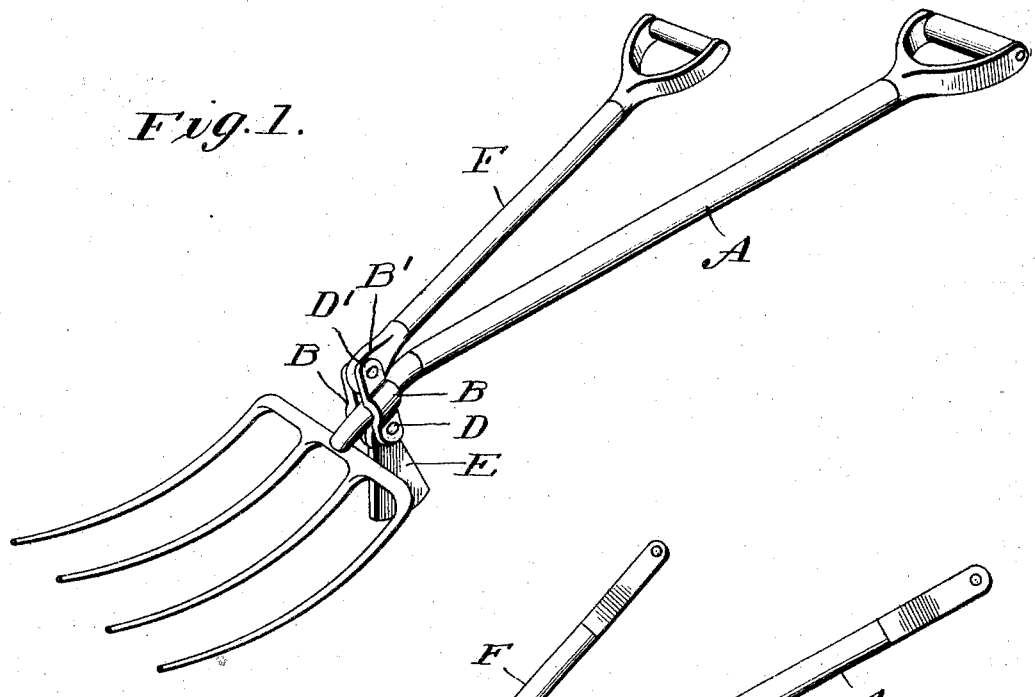
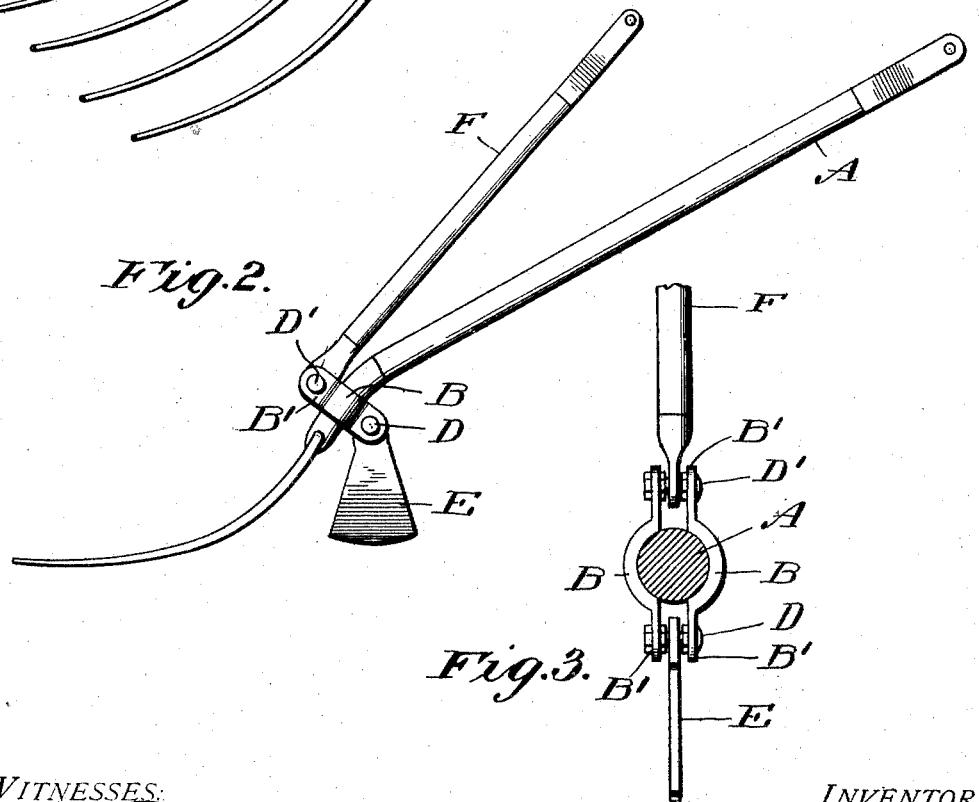
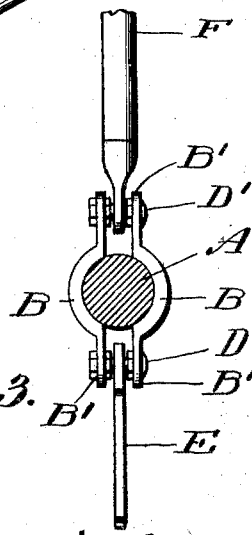
WITNESSES:
W. F. Doyle.
A. L. Hough.
INVENTOR
N. W. Coon,
BY
Franklin N. Hough
Attorney No. 766,933. Patented August 9, 1904.

UNITED STATES PATENT OFFICE.

NEWTON W. COON, OF ALBA, MICHIGAN.

GARDEN-TOOL.

SPECIFICATION forming part of Letters Patent No. 766,933, dated August 9, 1904.

Application filed April 22, 1904. Serial No. 204,471. (No model.)

*To all whom it may concern:*

Be it known that I, NEWTON W. COON, a citizen of the United States, residing at Alba, in the county of Antrim and State of Michigan, have invented certain new and useful Improvements in Garden-Tools; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in attachments for forks, shovels, &c.; and the object of the invention is to produce an attachment whereby a fulcrum is provided, over which the handle of the fork or other tool to which the device is applied may be utilized as a lever, and in the provision of a pivotal handle for assisting in raising the material loosened or engaged by the fork or other tool.

My invention consists, further, in various details of construction and in combinations and arrangements of parts, which will be hereinafter fully described and then specifically defined in the appended claims.

I illustrate my invention in the accompanying drawings, which, with the letters of reference marked thereon, form a part of this application, and in which—

Figure 1 is a perspective view showing the manner of application of my invention. Fig. 2 is an enlarged side elevation of the apparatus shown as applied to the handle of a fork. Fig. 3 is a cross-sectional view, parts being in elevation.

Reference now being had to the details of the drawings by letter, A designates the handle of a fork of the usual construction, and B B designate two clamping-jaws, having ears B' at the ends thereof, which are apertured to receive the adjusting-screws D and D'. Said clamping-jaws are concaved and are adapted to be held to the handle of a fork or other implement, adjacent to the tine or head thereof, in the manner shown in the drawings, said clamping-jaws being held securely together by means of screws D and D, passing through said ears B'.

Pivotally mounted or hinged upon the screw D is a fulcrum member E, which is adapted to rest upon the ground and over which the fork or other tool to which the device is attached may be fulcrumed, thus using the handle as a lever, and hinged to the screw D' is a handle F, which is utilized to raise the weight at the tines or upon the head of the tool, thus rendering it unnecessary for the operator to take hold of the handle with the second hand.

By the use of my improved attachment for forks, shovels, and other tools it will be observed that an efficient means is provided for fulcruming the handle of the tool and in raising weight by means of the handle F. Owing to the simple construction of my attachment, the same may be easily applied to the handles of ordinary tools and as easily detached therefrom.

While I have shown a particular construction of device illustrating my invention, it will be understood that I may vary the same as to details of construction, if desired, without in any way departing from the spirit of the invention.

Having thus fully described my invention, what I claim as new, and desire to secure by Letters Patent, is—

1. In combination with the handle of a fork, clamping members fastened thereto, a fulcrum member hinged to said clamping members, and means connected to said clamping members for raising the fork, as set forth.

2. In combination with the handle of a fork, clamping-plates embracing said handle, a fulcrum member hinged to said clamping members underneath the handle, and a hinged handle connected to the upper ends of said clamping members, as set forth.

3. In combination with the handle of a fork, concaved clamping-jaws, screws passing through lugs at the ends of said jaws, adapted to hold the same upon said handle, a fulcrum member hinged to one of said screws adjacent to the head of the fork, and a handle hinged to the screw fastening the upper ends of said clamping-jaws, as set forth.

In testimony whereof I hereunto affix my signature in presence of two witnesses.

NEWTON W. COON.

Witnesses:
W. E. JONES,
J. ANDERSON.